Figure 1:
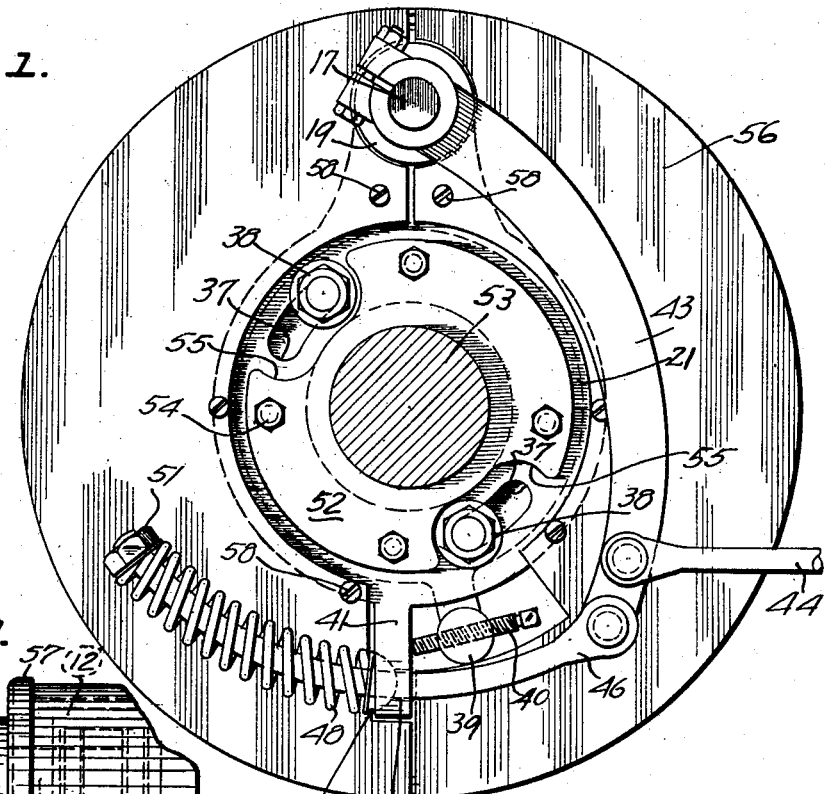

Nov. 22, 1932.  H. B. PEARSON  1,888,691
BRAKE
Filed April 16, 1929  2 Sheets-Sheet 1

INVENTOR.
HOWARD B. PEARSON
BY
ATTORNEYS.

Nov. 22, 1932. H. B. PEARSON 1,888,691
BRAKE
Filed April 16, 1929 2 Sheets-Sheet 2

INVENTOR.
HOWARD B. PEARSON
ATTORNEYS.

Patented Nov. 22, 1932

1,888,691

UNITED STATES PATENT OFFICE

HOWARD B. PEARSON, OF SAN FRANCISCO, CALIFORNIA

BRAKE

Application filed April 16, 1929. Serial No. 355,487.

The invention forming the subject matter of this application relates to brakes and particularly to expansion brakes of the pressure shoe type.

In expansion brakes of the pressure type commonly used at present, the pressure shoes are hinged on a fixed anchor, they pivot around the anchor so that the shoe end farther from the pivot describes an arc around the anchored end, when the brake is applied. This uneven expansive movement of the pressure shoes creates uneven brake pressure, namely the pressure at the free ends of those shoes will be larger than the pressure at points of the shoes nearer to the anchored ends thereof. Uneven pressure causes uneven wear of the brake lining, because the portions of the lining at the free end of the shoes are the only parts of the lining where high brake efficiency is produced.

Ordinarily the above type of brakes employ a cam to operate the brake mechanism, but such cam does not move the anchor, it moves the pressure shoes around the anchor as a pivot.

It is the primary object of my invention to provide a brake in which the entire brake band is rotatable and being so supported as to allow free movement of the brake band to any position it may be forced, the brake mechanism being adapted to be held rigid at all positions to which it may be brought, without in any way distorting the shape of the brake band.

Another object of the invention is the provision of a brake in which the tightening adjustment, can be accomplished by the single adjustment of a stationary member without causing the brake to bind at any point. In the ordinary brakes using a brake band, if the brake is adjusted only at one point of the mechanism, other points of the brake and brake band will drag, and it usually requires from two to sometimes seven separate adjustments on such a brake to create the proper, equal clearance all around the brake lining. In my brake the adjustment is achieved by the movement of a single, normally stationary, adjusting element, which in itself is capable of producing the required equal tightness and clearance at all points of the brake lining.

In the ordinary brakes which may utilize a self-energizing principle, namely the creation of brake pressure by the brake mechanism itself, this self energizing begins at a single point of contact of the brake lining, and then it is limited to certain portions of the brake, such as the top or bottom of the brake mechanism, wherever the free ends of the expansion shoes may be forced. Therefore it is another object of my invention to provide a brake which fully utilizes the self energizing principle of the brake mechanism around the entire periphery of the brake lining, namely after the initial expansion of the brake band, the entire brake lining is brought into contact with the rotating drum in such a manner as to create the required brake pressure instantaneously, and at all points of the brake lining.

Another object of the invention is the provision of a brake in which the pressure created by the expansion of the brake band is equally and uniformly distributed throughout the entire periphery of the band and of the lining; thus the shape of the band is retained without distortion, and the pressure on the inner periphery of the drum is uniform; thereby relieving the strain on the bearing of the rotary element to which the brake is applied; by the elimination of excessive pressure on one point of the drum, brake squeaks and groans, usually set up by fine vibrations in the ordinary unbalanced brakes, are entirely obviated.

Another object of the invention is the provision of an expansion brake having a single piece brake band supported on a floating anchor mechanism, and operated by the anchor supporting shaft positively, and with high efficiency at all points of the inner brake drum periphery; the means to expand said brake band being supported on a central stationary hub element, which latter is adapted to accomplish the simultaneous adjustment of said expansion means.

Other objects and advantages are to provide an expansion brake that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 2:
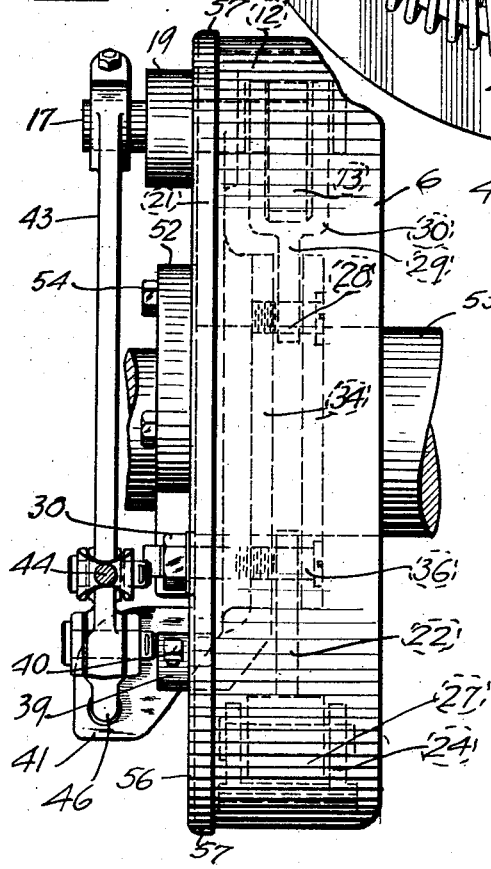
Figure 3:
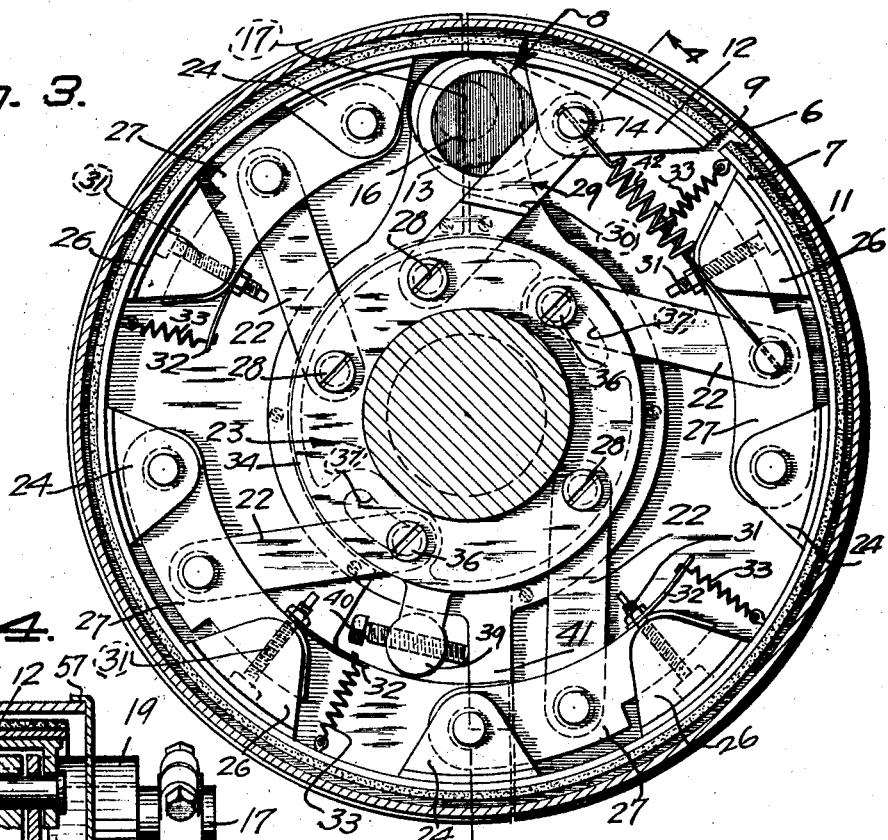
Figure 4:
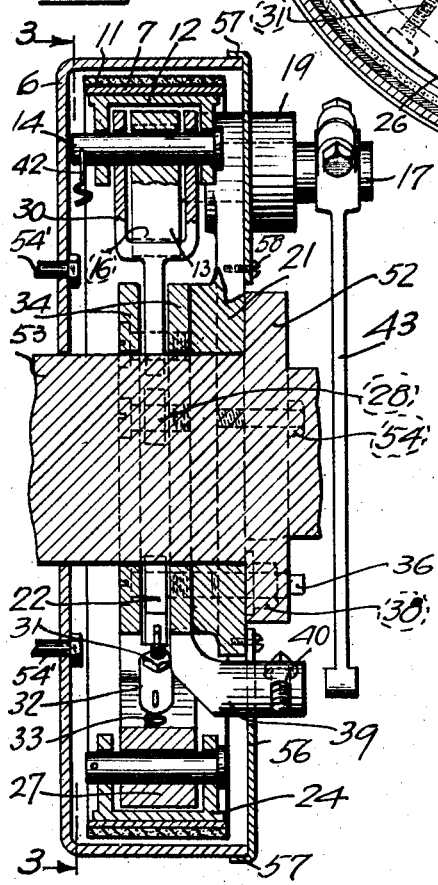
Figure 5:
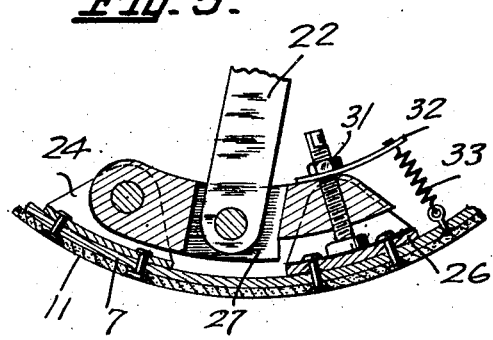

The invention is clearly illustrated in the accompanying drawings in which:

Fig. 1 is a rear view of the brake;
Fig. 2 is a side elevation of the brake;
Fig. 3 is a sectional view of the brake, the section being taken on the line 3—3 of Fig. 4;
Fig. 4 is a sectional view of the brake, the section being taken on the line 4—4 of Fig. 3; and
Fig. 5 is a fragmentary sectional view of the brake pressure equalizer mechanism of the brake.

In carrying out my invention I make use of a rotatable brake drum 6 in which is supported a single piece brake band 7, on a floating anchor mechanism 8. The ends of the brake band 7 are spaced from each other as at 9. On the outer periphery of the brake band 7 is the usual brake lining 11 for frictional engagement with the inner periphery of the drum 6.

The brake band 7 is supported on the anchor mechanism 8 by an anchor shoe 12, having a substantially U-shaped cross section, to the legs of which shoe 12 is pivotally secured a link 13 by means of an anchor pin 14. The link 13 fulcrums around an eccentric 16 and is rotatable around the eccentric, the eccentric 16 being an integral part of an operating shaft 17. The shaft 17 is rotatably supported in a bearing bracket 19 of a stationary brake mounting 21. The brake band 7 is circular so that in inoperative position there is a substantially annular clearance provided between the outer periphery of the brake lining 11 and the inner periphery of the drum 6.

In order to apply the brake an initial movement must be created to rotate the entire brake band in the direction of the drum rotation, in a contra-clockwise direction, viewing Fig. 3. Then means are provided to simultaneously expand the entire brake band. These expanding means are first actuated by the rotation of the band until the initial frictional contact is created at the inner periphery of the drum, then the rotation of the drum creates the additional pressure required for retarding or stopping the rotation of the drum. Thus my brake is rendered self-energizing, namely, in my brake after the band is rotated to a certain extent so as to create the initial expansion and frictional engagement thereof with the drum, the additional pressure required to stop the drum rotation is generated by the brake mechanism itself. The brake is applied by rotating and expanding the band also when the drum is rotated in reverse direction, except that in this latter instance the brake is not self-energizing, the braking power in this latter case must be developed by manual pressure of the brake operating mechanism.

The slight rotation of the brake band 7 is accomplished by the rotation of the eccentric 16, which will cause such movement of the link 13 as to result in the rotation of the band 7 in contraclockwise direction viewing Fig. 3. The expansion of the brake band 7 and the creation of the brake pressure is accomplished by the use of a plurality of expansion arms 22 which connect the brake band 7 to a central stationary element 23. The expansion arms 22 are not attached directly to the brake band 7, but are so connected thereto as to effect the equalizing of the brake pressure in the brake mechanism. Four pairs of pressure distributing shoes 24 and 26 are fixedly secured at regular intervals to the inner periphery of the brake band 7. In each pair of said shoes is disposed an equalizer link 27. The shoes are of substantially U-shaped cross section, the legs thereof extending radially toward the center of the brake mechanism. An end of each equalizer link 27 is pivotally secured in the respective shoe 24, while the other end of the equalizer link 27 is free to move in the respective shoe 26. The expansion arms 22 are pivotally secured to the respective equalizer links 27 midway between the shoes 24 and 26.

When the brake band is rotated in a contraclockwise direction viewing Fig. 3, the expansion arms 22 are turned around their respective inner pivots 28, however, the arms 22 are disposed at such an angle that the arcs described by the outer ends thereof are eccentric relatively to the brake drum, hence the said outer arm-ends are moved toward the drum periphery, whereby the expansion of the brake band 7 is caused. Each arm 22 is longer than the radial distance between its inner pivot 28 and the inner periphery of the drum 7, thus the tendency of the drum 6 to rotate the brake band 7 does not turn the arms 22 completely around their inner pivot 28, instead, it forces the ends of the arms 22 outwardly, thereby generating the brake pressure which is proportionate to the speed of rotation of the drum 6 and to the frictional resistance of the brake lining 11. The pressure thus created is transmitted through the equalizers 27, with equal force upon the respective shoes 24 and 26 and is equally distributed throughout the entire brake band 7.

It is to be noted that an expansion arm 29 is pivotally secured at the opposite ends thereof to the stationary element 23 and to the anchor shoe 12, in such a position as to act similarly to the expansion arms 22 for expanding the band 7 thereat. The outer end of the arm 29 is formed in the shape of a clevis 30 so as to straddle the link 13 at the anchor pin 14, the entire clevis 30 being disposed between the legs of the shoe 12.

In order that the equalizer 27 may function properly and distribute the pressure evenly on the brake band, the connection between the free end of the equalizer 27 and the shoe 26 is made adjustable. A set screw 31 is threadedly secured in the free end of the equalizer 27 and extends therethrough so as to bear upon the bottom of the shoe 26. By threading the screw into the equalizer 27, the said shoe 26 is forced away from the end of the equalizer. Thus, the proper curvature of the brake band 7 is achieved by a facile adjustment of the screw 31, and the true curvature thus maintained assures proper braking pressure throughout the entire outer periphery of the lining; furthermore the true curvature results in an even wear of the entire lining. From the top of the equalizer 27 and from below the head of the screw 31 extends outwardly a plate 32, at the end of which is attached an end of a tension spring 33, the other end of said spring being attached to the band 7, so as to resiliently press the free end of the equalizer 27 and the screw 31 toward the respective shoe 26. This spring lends a certain resiliency to compensate for slight inaccuracies of adjustment.

The stationary element 23 is rendered stationary by reason of its particular connection to the brake mounting 21. The element 23 is constructed of two parallel disks 34, spaced from each other and receiving therebetween the inner ends of the arms 22 and of the arm 29, the pivots 28 of which extend through both disks 34 at regular intervals adjacent to the outer circumference thereof.

The inner pivotal connections of two of the arms 22 are constructed in the manner illustrated in Fig. 4. Pivot screws 36 of these two arms extend not only through the disks 34 and through the inner ends of the respective arms 22 but also through elongated, arcuate slots 37 in the brake mounting 21. It is to be noted here that the mounting 21 constitutes a circular disk with the bearing bracket 19 extending radially therefrom. Upon the threaded ends of the two last mentioned pivot screws 36, are nuts 38 which bear against the outer face of the stationary brake mounting 21, thereby holding the disks 34 in fixed position so as to enable the stationary element 13 to support the inner ends of the arms 22 and of the arm 29.

In order to facilitate adjustment and to further hold the element 23 against rotation, an extension 39 is formed on the lowermost point of the outer disk 34, which extension protrudes outside of the mounting 21 and opposite to a lug 41 formed on the lower portion of the mounting 21. An adjusting screw 40 extends through said extension 39 and bears against the lug 41. It is to be noted that the extension 39 is disposed in clockwise direction from the lug 41, viewing Fig. 3, so that the action of the screw 40 resists counter-clockwise movement of the disks 34. After loosening the nuts 38, the adjustment of all the expansion arms may be simultaneously effected by the turning of the adjusting screw 40, whereby the extension 39 is spaced relatively to the lug 41, thus the disks 39 may be moved to change the angularity of all the expansion arms at once. The clearance between the lining 11 and the drum when the curvature of the band 7 is properly adjusted will be such that the expansion of the brake band 7 will cause the instantaneous contacting of the lining with the drum with an equal pressure at all points around the periphery thereof. As heretofore set forth, the proper curvature is adjusted by the adjusting screws 31, however, the adjustment of the band curvature is required only at the first assembly of my brake, or sometimes after the relining of the brake, otherwise the screws 31 are to be securely locked in their adjusted position. The usual adjustment for tightness once the brake is assembled, is accomplished merely by the aforesaid movement of the stationary members.

In order to prevent vibration or rattling of the brake band 7 within the drum, an anti-rattle spring 42 is provided, one end of the anti-rattle spring 42 is attached to the anchor pin 14, the other end thereof to the outer pivot of the expansion arm 22 adjacent the free end of the band 7. By this spring 42 the brake band is held in its substantially annular shape, without allowing the vibration of the unanchored end thereof, whereby rattling or the like is effectively obviated.

The brake is applied by the rotation of the operating shaft 17 in the bearing bracket 19. For this purpose I provide a brake operating arm 43 secured to the operating shaft 17 and having a brake pull rod 44 pivotally attached thereto adjacent the free end thereof. On the free end of the operating arm 43 is pivotally secured an arcuate lever 46, slidably guided in an aperture 47 in the lug 41. On the portion of the arcuate lever 46, beyond the lug 41, is mounted a brake release spring 48, bearing at one end against a semispherical bearing member 49 in the lug 41, and on the other end against a nut 51 on the free end of the arcuate lever 46. A pull on the pull rod 44, moves the operating arm 43 and the lever 46 against the action of the spring 48, thus rotating the shaft 17. The rotation of the shaft 17 rotates the eccentric 16, thereby so moving the floating anchor 8 as to rotate the entire brake band 7 in contra-clockwise direction, viewing Fig. 3. By the rotation of the brake band 7, the expansion arms 22 and 29 are moved around their inner pivots and thereby cause the initial expansion of the band 7. Immediately when the lining 11 contacts with the drum 6, the self-energizing action commences, because the drum tends to rotate the band in contra-clockwise direction, thereby a force is exerted on the expansion arms 22 and 29, which force is equally distributed over the entire brake band and creates the pressure to effectively press the lining 11 against the inner periphery of the drum 6. This pressure must be exerted manually when the drum rotates in a reverse direction. The element 23 is held stationary by reason of its connection with the brake mounting 21. When the pull on the pull rod 44 is released, the action of the spring 48 returns the operating arm 43 to its original position, thus causing the rotation of the shaft 17 in clockwise direction, viewing Fig. 3. The shaft 17 thus returns the link 13 and the floating anchor 8 to their respective released positions, rotating the brake band 7 therewith, which in turn results in the movement of the expansion arms 22 and 29 into their released position. Thus the lining 11 is moved out of its contacting position.

The brake heretofore described may be mounted upon any rotary mechanism by securing the brake mounting 21 thereof to a stationary part of the mechanism, and by securing the drum 6 to a rotary machine part.

The illustration on the drawings shows the brake mounting 21 secured to a flange 52 of a stationary axle 53, by means of machine screws 54. The flange is cut away as at 55, to accommodate the adjustable pivot screws 36 and nuts 38.

In the event the brake is used on the rear wheel of an automotive vehicle, the brake mounting 21 would be attached to a flange similar to flange 52 except that the flange would be a part of a stationary axle housing, within which the rear axle rotates. The drum 6 is attached to the rotating element, such as a wheel by means of bolts or screws 54', indicated in Fig. 4.

It is to be noted that a dust cover 56 is provided to cover the open end of the drum 6. On the outer circumference of the cover 56 is formed an annular flange 57 overlapping the outer periphery of the drum 6, to protect the brake mechanism from dust, or the like. The dust cover is secured to the brake mounting 21 by means of screws 58, and it is split, or formed in two halves so that it may be removed, without necessitating the complete dismantling of the brake. This removable dust cover permits the adjustment of the brake mechanism without demounting the brake.

It will be recognized that the afore-described brake may be adjusted without removing the load from the bearings of the mechanism on which the brake is employed. When my brake is used in connection with automotive vehicles it is not necessary to jack up the wheel in order to adjust the brake. Such adjustment may be effected with the full weight of the vehicle on the wheels. It will be also recognized that a brake is provided which obtains the power for the brake pressure from the inertia of the moving vehicle in a forward direction, or of the rotating element in one direction, and in this event the only effort required to apply the brake is to overcome the tension of the spring 48, and effect the initial rotation of the brake band, thereafter the brake energizes itself. My brake combines simplicity of operation and of adjustment, with ruggedness of construction and positiveness of operation which readily adapts the brake mechanism for its use; it adjusts itself to take up wear in the moving parts thereof, and its proper adjustment of tightness between its lining and drum may be accomplished by a single adjustment. My invention provides an expansion brake mechanism with a single piece brake band supported on a floating anchor, and operated through the anchor supporting shaft, positively and with high efficiency at every point of the inner brake drum periphery.

Having thus described this invention, what I claim and desire to secure by Letters Patent, is:

1. A brake comprising a stationary element; a brake drum rotatable relative to said element; a brake band in said drum; an anchor for holding said brake band in position; means to move the anchor on a substantially lineal path to rotate said brake band relatively to said mounting element and means actuated by the rotation of said brake band to expand said brake band thereby pressing the same against the drum.

2. A brake comprising a stationary element; a brake drum rotatable relative to said element; a brake band in said drum; a floating anchor supported on said element for holding said brake band in position; means to rotate said brake band relatively to said mounting element; means actuated by the rotation of said brake band to expand said brake band thereby pressing the same against the drum; and means connected between the brake band and said expanding means to distribute and equalize the brake pressure throughout the entire band.

3. A brake comprising a stationary element; a brake drum rotatably supported in operative relation thereto; a brake band in said drum; an anchor to support said brake band in position; means for supporting said anchor and for moving the same on a substantially lineal path so as to rotate the brake band relatively to said mounting element; and adjusting means actuated by the rotation of the brake band to expand said brake band thereby pressing the same against the drum.

4. A brake comprising a stationary element; a brake drum rotatably supported in operative relation thereto; a brake band in said drum; an anchor to support said brake band in position; means for supporting said anchor and for actuating the same so as to rotate the brake band relatively to said mounting element; means actuated by the rotation of the brake band to expand said brake band thereby pressing the same against the drum; and means connected between the brake band and said expanding means to distribute and equalize the brake pressure throughout the entire band.

5. A brake comprising a stationary element; a brake drum rotatably supported in operative relation thereto; a brake band in said drum; an anchor to support said brake band in position; eccentric means for supporting said anchor and for moving the same on a substantially lineal path so as to rotate the brake band relatively to said mounting element; means actuated by the rotation of the brake band to expand said brake band thereby pressing the same against the drum, said expanding means comprising expansion arms connected at regular intervals to the brake band; and a stationary member for pivotally supporting the inner ends of said arms so as to allow the movement of the outer ends of said arms toward the drum, when the brake band is moved in the direction of the drum rotation.

6. A brake comprising a stationary element; a brake drum rotatably supported in operative relation thereto; a brake band in said drum; a floating anchor to support said brake band in position; means for supporting said anchor and for actuating the same so as to rotate the brake band relatively to said mounting element; means actuated by the rotation of the brake band to expand said brake band thereby pressing the same against the drum, said expanding means comprising expansion arms connected at regular intervals to the brake band; and a stationary member for pivotally supporting the inner ends of said arms so as to allow the movement of the outer ends of said arms toward the drum, when the brake band is rotated, said stationary member being adjustable for simultaneously varying the angular positions of said expansion arms.

7. A brake comprising a stationary element; a brake drum rotatably supported in operative relation thereto; a brake band in said drum; a floating anchor to support said brake band in position; means for supporting said anchor and for actuating the same so as to rotate the brake band relatively to said mounting element, means actuated by the rotation of the brake band to expand said brake band thereby pressing the same against the drum, said expanding means comprising expansion arms connected at regular intervals to the brake band; a stationary member for pivotally supporting the inner ends of said arms so as to allow the movement of the outer ends of said arms toward the drum, when the brake band is rotated, said stationary member being adjustable for simultaneously varying the angular positions of said expansion arms; and means connected between the outer ends of the arms and the brake band to distribute and equalize the expansion.

8. A brake comprising a stationary element; a brake drum rotatably supported in operative relation thereto; a brake band in said drum; a floating anchor to support said brake band in position; means for supporting said anchor and for actuating the same so as to rotate the brake band relatively to said mounting element; means actuated by the rotation of the brake band to expand said brake band thereby pressing the same against the drum, said expanding means comprising expansion arms connected at regular intervals to the brake band; a stationary member for pivotally supporting the inner ends of said arms so as to allow the movement of the outer ends of said arms toward the drum, when the brake band is rotated, said stationary member being adjustable for simultaneously varying the angular positions of said expansion arms; and means connected between the outer ends of the arms and the brake band to distribute and equalize the expansion, said equalizing means being adjustable so as to cause the proper shape and expansion of said brake band at all points of its periphery.

9. In a brake, a brake drum adapted to be attached to a rotary element of a mechanism; a mounting element adapted to be attached to a stationary element of said mechanism, in operative relation to said drum; a brake band disposed in said drum; anchoring means inside of the brake band being supported on the mounting element for anchoring said brake band; means to move said anchoring means so as to move the band within said drum; expansion arms being connected at regular intervals to the band, and being held against rotation by their connection to said mounting element; said arms being so movable as to exert an outward pressure against said brake band when said band is actuated, so as to expand the same; and means to automatically return said anchor and brake band to their inoperative position, when released.

10. In a brake, a brake drum adapted to be attached to a rotary element of a mechanism; a mounting element adapted to be attached to a stationary element of said mechanism, in operative relation to said drum; a brake band disposed in said drum; floating means supported on the mounting element for anchoring said brake band; means to actuate said floating means so as to move the band within said drum; expansion arms being connected at regular intervals to the band, and being held against rotation by their connection to said mounting element; said arms being so movable as to exert an outward pressure against said brake band when said band is actuated, so as to expand the same; means to automatically return said anchor and brake band to their inoperative position, when released; and means connected between the expansion arms and the brake band to equally distribute the expansion pressure throughout the periphery of the band.

11. In a brake, a brake drum adapted to be attached to a rotary element of a mechanism; a mounting element adapted to be attached to a stationary element of said mechanism, in operative relation to said drum; a brake band disposed in said drum; floating means supported on the mounting element for anchoring said brake band; means to actuate said floating means so as to move the band within said drum; expansion arms being connected at regular intervals to the band, and being held against rotation by their connection to said mounting element, said arms being so movable as to exert an outward pressure against said brake band when said band is actuated, so as to expand the same; means to automatically return said anchor and brake band to their inoperative position, when released; and means connected between the expansion arms and the brake band to equally distribute the expansion pressure throughout the periphery of the band, said last means being adjustable to equalize the said pressure, relatively to the drum periphery.

12. In a brake, a brake drum adapted to be attached to a rotary element of a mechanism; a mounting element adapted to be attached to a stationary element of said mechanism, in operative relation to said drum; a brake band disposed in said drum; floating means supported on the mounting element for anchoring said brake band; means to actuate said floating means so as to move the band within said drum, expansion arms being connected at regular intervals to the band, and being held against rotation by their connection to said mounting element; said arms being so movable as to exert an outward pressure against said brake band when said band is actuated, so as to expand the same; means to automatically return said anchor and brake band to their inoperative position, when released; means connected between the expansion arms and the brake band to equally distribute the expansion pressure throughout the periphery of the band, said last means being adjustable to equalize the said pressure, relatively to the drum periphery; and a central stationary element pivotally supporting the inner ends of said expansion arms.

13. In a brake, a brake drum adapted to be attached to a rotary element of a mechanism; a mounting element adapted to be attached to a stationary element of said mechanism, in operative relation to said drum; a brake band disposed in said drum; floating means supported on the mounting element for anchoring said brake band; means to actuate said floating means so as to move the band within said drum, expansion arms being connected at regular intervals to the band, and being held against rotation by their connection to said mounting element; said arms being so movable as to exert an outward pressure against said brake band when said band is actuated, so as to expand the same; means to automatically return said anchor and brake band to their inoperative position, when released; means connected between the expansion arms and the brake band to equally distribute the expansion pressure throughout the periphery of the band, said last means being adjustable to equalize the said pressure, relatively to the drum periphery; a central stationary element pivotally supporting the inner ends of said expansion arms; and means to adjust said stationary element relatively to said mounting element, so as to adjust the position of said inner arm ends and of the angular position of said expansion arms.

14. In a brake, a brake drum adapted to be attached to a rotary element of a mechanism; a mounting element adapted to be attached to a stationary element of said mechanism, in operative relation to said drum; a brake band disposed in said drum; floating means supported on the mounting element for anchoring said brake band; means to actuate said floating means so as to move the band within said drum, expansion arms being connected at regular intervals to the band, and being held against rotation by their connection to said mounting element; said arms being so movable as to exert an outward pressure against said brake band when said band is actuated, so as to expand the same; means to automatically return said anchor and brake band to their inoperative position, when released; and resilient means to connect the free end of the band to the anchored end of the band, for preventing the vibration of the band.

15. In a brake, a brake drum adapted to be attached to a rotary element of a mechanism; a mounting element adapted to be attached to a stationary element of said mechanism, in operative relation to said drum; a brake band disposed in said drum; floating means supported on the mounting element for anchoring said brake band; means to actuate said floating means so as to move the band within said drum; expansion arms being connected at regular intervals to the band, and being held against rotation by their connection to said mounting element; said arms being so movable as to exert an outward pressure against said brake band when said band is actuated, so as to expand the same; means to automatically return said anchor and brake band to their inoperative position when released, said anchoring means comprising an anchor shoe adjacent an end of said band, a lever arm pivotally connected to said shoe; an eccentric around which the lever arm fulcrums; and an operating shaft to support and to rotate said eccentric.

16. In a brake, a brake drum adapted to be attached to a rotary element of a mechanism; a mounting element adapted to be attached to a stationary element of said mechanism in operative relation to said drum; a brake band disposed in said drum; floating means supported on the mounting element for anchoring said brake band; means to actuate said floating means so as to move the band within said drum, expansion arms being connected at regular intervals to the band, and being held against rotation by their connection to said mounting element, said arms being so movable as to exert an outward pressure against said brake band when said band is actuated, so as to expand the same; means to automatically return said anchor and brake band to their inoperative position, when released; means connected between the expansion arms and the brake band to equally distribute the expansion pressure throughout the periphery of the band, each of said pressure distributing means comprising a pair of shoes fixedly mounted on the band in spaced relation to each other; an equalizer member pivotally mounted on one shoe and adjustably bearing on the other shoe, the outer sides of said connecting arms being connected to an intermediate point of the respective equalizer members.

17. In a brake, a brake drum adapted to be attached to a rotary element of a mechanism; a mounting element adapted to be attached to a stationary element of said mechanism in operative relation to said drum; a brake band disposed in said drum; floating means supported on the mounting element for anchoring said brake band; means to actuate said floating means so as to move the band within said drum, expansion arms being connected at regular intervals to the band, and being held against rotation by their connection to said mounting element, said arms being so movable as to exert an outward pressure against said brake band when said band is actuated, so as to expand the same; means to automatically return said anchor and brake band to their inoperative position, when relased; means connected between the expansion arms and the brake band to equally distribute the expansion pressure through the periphery of the band, each of said pressure distributing means comprising a pair of shoes fixedly mounted on the band in spaced relation to each other; an equalizer member pivotally mounted on one shoe and adjustably bearing on the other shoe, the outer sides of said connecting arms being connected to an intermediate point of the respective equalizer members; and an expansion arm connecting said anchor shoe to the central stationary member.

18. In a brake, a brake drum adapted to be attached to a rotary element of a mechanism; a mounting element adapted to be attached to a stationary element of said mechanism in operative relation to said drum; a brake band disposed in said drum; floating means supported on the mounting element for anchoring said brake band; means to actuate said floating means so as to move the band within said drum, expansion arms being connected at regular intervals to the band, and being held against rotation by their connection to said mounting element, said arms being so movable as to exert an outward pressure against said brake band when said band is actuated, so as to expand the same; means to automatically return said anchor and brake band to their inoperative position, when released; means connected between the expansion arms and the brake band to equally distribute the expansion pressure through the periphery of the band, each of said pressure distributing means comprising a pair of shoes fixedly mounted on the band in spaced relation to each other; an equalizer member pivotally mounted on one shoe and adjustably bearing on the other shoe, the outer sides of said connecting arms being connected to an intermediate point of the respective equalizer members; and an expansion arm connecting said anchor to the central stationary member, said expansion arms being longer than the radial distance between their inner pivotal points and the inner periphery of the drum and being inclined against the direction of the band rotation.

In testimony whereof, I have hereunto set my hand at San Francisco, California, this 8th day of April, 1929.

HOWARD B. PEARSON.